(12) United States Patent
Nishio

(10) Patent No.: US 7,805,493 B2
(45) Date of Patent: Sep. 28, 2010

(54) NETWORK SERVICE SYSTEM, SERVICE PROXY PROCESSING METHOD, COMPUTER-READABLE STORAGE MEDIUM STORING PROGRAM, AND PROGRAM THEREFOR

(75) Inventor: Masahiro Nishio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1195 days.

(21) Appl. No.: 10/547,348

(22) PCT Filed: May 12, 2004

(86) PCT No.: PCT/JP2004/006698

§ 371 (c)(1),
(2), (4) Date: Sep. 1, 2005

(87) PCT Pub. No.: WO2004/099962

PCT Pub. Date: Nov. 18, 2004

(65) Prior Publication Data

US 2006/0101109 A1 May 11, 2006

(30) Foreign Application Priority Data

May 12, 2003 (JP) .............................. 2003-133544

(51) Int. Cl.
*G06F 15/16* (2006.01)
*G06F 1/00* (2006.01)
(52) U.S. Cl. ...................................... 709/208; 713/310
(58) Field of Classification Search ......... 709/220–222, 709/249, 208; 713/300, 310, 324
See application file for complete search history.

(56) References Cited

U.S. PATENT DOCUMENTS

| 6,085,328 | A | 7/2000 | Klein et al. ................. 713/310 |
| 6,560,713 | B1* | 5/2003 | Chary ........................ 713/340 |
| 6,701,442 | B1* | 3/2004 | Kunz et al. ................. 713/300 |
| 7,107,442 | B2* | 9/2006 | Cheshire ........................ 713/1 |
| 2005/0219120 | A1* | 10/2005 | Chang .................... 342/357.13 |
| 2006/0075100 | A1* | 4/2006 | Stirbu ........................ 709/225 |
| 2006/0075269 | A1* | 4/2006 | Liong et al. ................. 713/300 |
| 2007/0004436 | A1* | 1/2007 | Stirbu ........................ 455/503 |
| 2007/0078959 | A1* | 4/2007 | Ye ............................. 709/223 |
| 2007/0101407 | A1* | 5/2007 | Cheung et al. ................. 726/4 |
| 2008/0120414 | A1* | 5/2008 | Kushalnagar et al. ....... 709/226 |

FOREIGN PATENT DOCUMENTS

| JP | 5-175964 | 7/1993 |
| JP | 12-165419 | 6/2000 |
| JP | 2000-165419 A | 6/2000 |

\* cited by examiner

*Primary Examiner*—George C Neurauter, Jr.
(74) *Attorney, Agent, or Firm*—Fitzpatrick, Cella, Harper & Scinto

(57) ABSTRACT

A service proxy processing method is used with a network service system in which a service providing device connected over a network for performing predetermined capability processing can communicate with a plurality of client devices for performing network connection capability processing for recognizing connection status of each service providing device over a network. Each service providing device has a proxy process step of specifying a specific communications capability in response to a communications capability request from any client device when a predetermined service providing process is not performed in a predetermined period, allowing any service providing device in a network to perform as a proxy a communications process based on the specified specific communications capabilities, and making a transition to a network sleep status not recognized by a client device in the network.

15 Claims, 15 Drawing Sheets

```
M-SEARCH*HTTP/1.1
HOST: 239.255.255.250:1900
MAN: "ssdp:discover"
MX: 60
ST: ProxyServer
CONTENT-LENGTH: bytes in body
CONTENT-TYPE: text/xml ; charset="utf-8"

4-1-A  <Envelope>
         <Body>
           <FindProxy>
4-2        <MyID> qlmstnamrzpjumqg </MyID>
4-3      { <RequestedProtocol> UPnPv1 </RequestedProtocol>
           <RequestedProtocol> Apple Rendezvous </RequestedProtocol>
           </FindProxy>
         </Body>
4-1-B  </Envelope>
```

FIG. 4

```
HTTP/1.1 200 OK
CACHE-CONTROL : max-age=seconds until advertisement expires
DATE : when response was generated
CONTENT-LENGTH : bytes in body
CONTENT-TYPE : text/xml ; charset="utf-8"

<Envelope>
  <Body>
    <FindProxyResponse>
5-1 ~ <KeyCodeURL> 122. 222. 222. 123 </KeyCodeURL>
5-2 ~ <ProxyRequestURL> 122. 222. 222. 123 : 1010 </ProxyRequestURL>
    </FindProxyResponse>
  </Body>
</Envelope>
```

```
POST path of control URL HTTP/1.1
HOST : host of control URL : port of control URL
CONTENT-LENGTH : bytes in body
CONTENT-TYPE : text/xml ; charset="utf-8"

<Envelope>
  <Body>
    <GetKeyCode>
8-1     <MyID> qlmstnamrzp jumqg </MyID>
    </GetKeyCode>
  </Body>
</Envelope>
```

FIG. 8

```
HTTP/1.1 200 OK
CACHE-CONTROL : max-age=seconds until advertisement expires
DATE : when response was generated
CONTENT-LENGTH : bytes in body
CONTENT-TYPE : text/xml ; charset="utf-8"

<Envelope>
  <Body>
    <GetKeyCodeResponse>
      <KeyCode> Kansakoqumevnjiz </KeyCode>
    </GetKeyCodeResponse>
  </Body>
</Envelope>
```

FIG. 10

```
           POST path of control URL HTTP/1.1
           HOST : host of control URL : port of control URL
           CONTENT-LENGTH : bytes in body
           CONTENT-TYPE : text/xml ; charset="utf-8"

10-1-A — <Envelope>
             <Body>
  10-2-A — <ProxyRequested>
             <MyID> qlmstnamrzp jumqg </MyID>
             <Protocol>
    10-3-A — <ProtocolName> UPnPv1 </ProtocolName>
               <Proxy> Discovery </Proxy>
        10-4 { <Proxy> Description </Proxy>
               <Proxy> Event Subscribe </Proxy>
               <WakeUP> Control </WakeUP>
               <WakeUP> Presentation </WakeUP>
             </Protocol>
    10-3-B — <Protocol>
               <ProtocolName> Rendezvous </ProtocolName>
        10-5 — <WakeUP> ALL </WakeUP>
             </Protocol>
  10-2-B — </ProxyRequested>
             </Body>
10-1-B — </Envelope>
```

FIG. 11

```
HTTP/1.1 200 OK
CACHE-CONTROL : max-age=seconds until advertisement expires
DATE : when response was generated
CONTENT-LENGTH : bytes in body
CONTENT-TYPE : text/xml ; charset="utf-8"
```

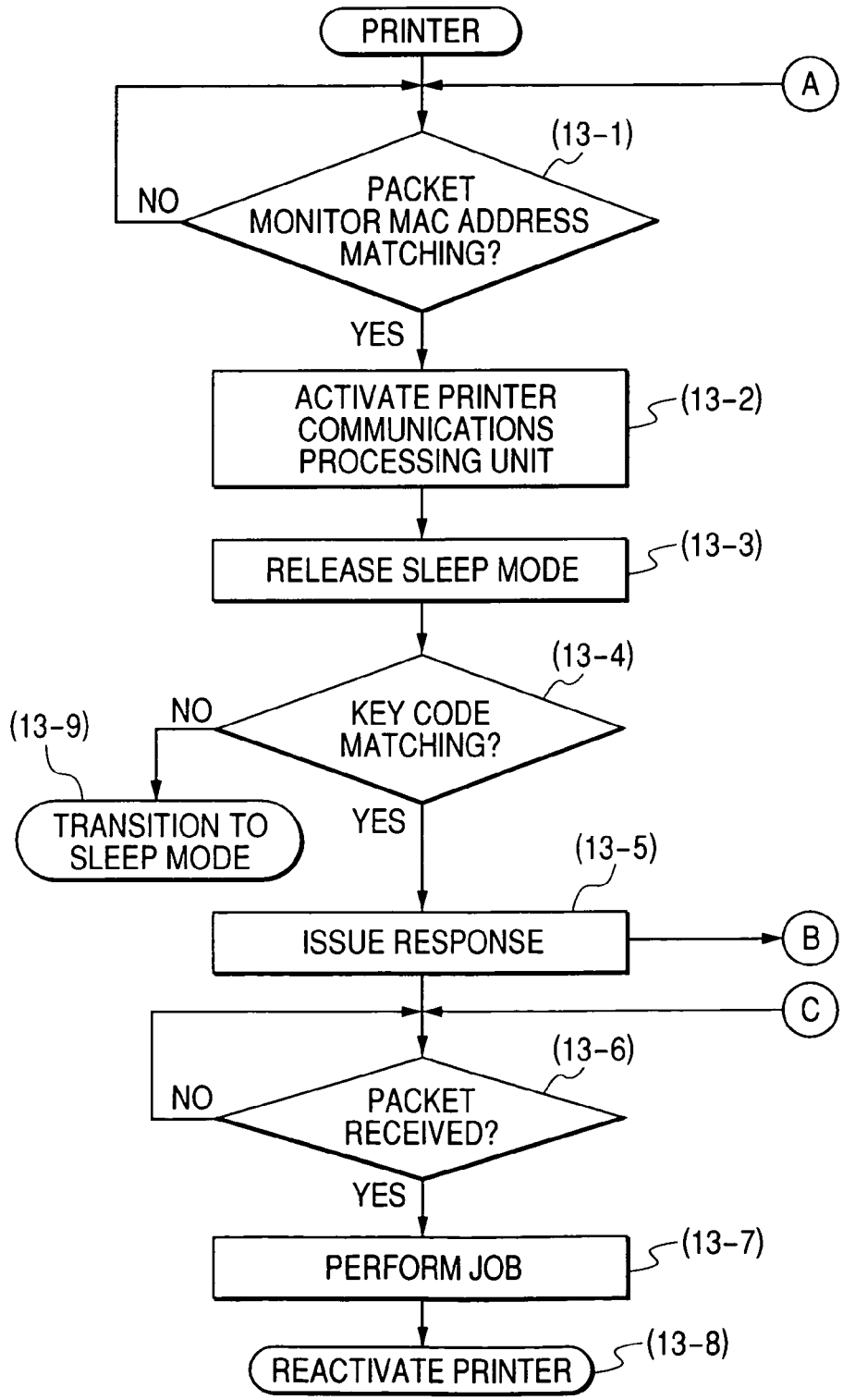

FIG. 14

```
POST path of control URL HTTP/1.1
HOST : host of control URL : port of control URL
CONTENT-LENGTH : bytes in body
CONTENT-TYPE : text/xml ; charset="utf-8"
```

14-1-A ~ <Envelope>
    <Body>
14-2-A ~ <WakeUPRequest>
    14-3 ~ <KeyCode> kansakoqumevnjiz </KeyCode>
14-2-B ~ </WakeUPRequest>
    </Body>
14-1-B ~ </Envelope>

FIG. 15

```
HTTP/1.1 200 OK
CACHE-CONTROL : max-age=seconds until advertisement expires
DATE : when response was generated
CONTENT-LENGTH : bytes in body
CONTENT-TYPE : text/xml ; charset="utf-8"
```

FIG. 17

STORAGE MEDIUM
SUCH AS FD/CD-ROM, ETC

| DIRECTORY INFORMATION |
|---|
| FIRST DATA PROCESSING PROGRAM<br>PROGRAM CODES FOR FLOWCHART OF FIGURE 2 |
| SECOND DATA PROCESSING PROGRAM<br>PROGRAM CODES FOR FLOWCHART OF FIGURE 3 |
| THIRD DATA PROCESSING PROGRAM<br>PROGRAM CODES FOR FLOWCHART OF FIGURE 6 |
| FOURTH DATA PROCESSING PROGRAM<br>PROGRAM CODES FOR FLOWCHART OF FIGURE 9 |
| FIFTH DATA PROCESSING PROGRAM<br>PROGRAM CODES FOR FLOWCHART OF FIGURE 12 |
| SIXTH DATA PROCESSING PROGRAM<br>PROGRAM CODES FOR FLOWCHART OF FIGURE 13 |
| SEVENTH DATA PROCESSING PROGRAM<br>PROGRAM CODES FOR FLOWCHART OF FIGURE 16 |
| |

MEMORY MAP OF STORAGE MEDIUM

NETWORK SERVICE SYSTEM, SERVICE PROXY PROCESSING METHOD, COMPUTER-READABLE STORAGE MEDIUM STORING PROGRAM, AND PROGRAM THEREFOR

TECHNICAL FIELD

The present invention relates to a network service system and a service proxy processing method for performing power savings control of service providing device connected to a network, and a computer-readable storage medium storing a program, and a program therefore.

BACKGROUND ART

There have conventionally been a service providing apparatus and a service providing system in which a printer (including a copier and a multifunction device) and a computer are connected over a network.

For example, with the rapid progress of the Internet communication, network supported devices are rapidly being progressed in a manner such that not only the conventional personal computers but also user interactive devices such as a PDA (Personal Digital Assistance), a cellular phone, and the like, and image processing devices such as a scanner, a printer, a copying machine, a digital camera, and the like, a consumer electric appliances such as television, an air conditioner, a refrigerator, and the like, are made to communicate over networks.

In this situation, to enhance the convenience and easiness in using these network-capable devices, various protocols such as automatic setting means for a network address, discovery means for a network device, automatic configuration means for an application software, a utility software, an operating system to control network-capable devices have been proposed. Especially, the UPnP (registered trademark) mainly developed by Microsoft, BMLinkS (registered trademark) specified by JBMIA (Japan Business Machine Industry Association) and Rendezvous (registered trademark) supported by Apple OS X are well known protocols to plug and play network supported devices.

On the other hand, various improving means have been applied to reduce the power consumption by these network-capable devices from the energy savings viewpoint. The power consumption of a device driven by a small battery such as a PDA, a cellular phone, etc., is to be reduced for a long-time use. The reduced power consumption is an important factor of the diffusion of products such as a printer, a copying machine equipped with a thermal fixer which normally record large power consumption.

Normally, when these devices are not operated for a predetermined period, or kept in an idle status without performing communications with other devices for a predetermined period, then change into a sleep mode. In the sleep mode, electric power is supplied only to a one-chip microcomputer, a LAN controller, etc., which are low voltage devices, thereby maintaining the minimal communications capabilities with the power consumption reduced by stopping supply of unnecessary power.

In releasing the sleep mode, these devices monitor a packet having a specific data format, and when they receive the packet having a specific data format, the sleep mode is released and the normal communications process can be resumed (Japanese Patent Application Laid-Open No. H05-175964).

Furthermore, there is also a method proposed for automatically activating the resume feature of equipment such as a personal computer, etc., without disconnecting the virtual circuit of a LAN.

Additionally, in relation to a data processing device of standalone type, various devices using a protocol for plug and play represented by multiphase UPnP (registered trademark), BMLinkS (registered trademark), and Rendezvous (registered trademark) which install various applications by checking the status of the system configuration of hardware having plug and play extended in a network have been proposed for home electric appliances, computer system, etc., which are composed of various phases.

However, there have been the following problems with the above-mentioned conventional technologies.

For example, when a printer changes into the sleep mode, the low voltage devices such as the one chip microcomputer, the LAN controller, etc., take charge of the network processing thereafter. Since the devices such as the one chip microcomputer, the LAN controller, etc., are not intelligent, they cannot perform a predetermined process using a complicated communications protocol.

Therefore, they monitor a packet having a specific data format by operating only the data reception capability, and when they receive the packet having a specific data format, the sleep mode is released and a reception wait status is entered, thereby performing power savings control.

Furthermore, with the above-mentioned system configuration, not only an application and a utility using TCP/IP/UDP but also all using different protocols, for example, Netware, AppleTalk, etc., have to issue a "packet having a specific data format" immediately before issuing a job request (print job).

Therefore, to wake up the devices with such as the above-mentioned one-chip microcomputer, the LAN controller, all of client applications and utilities will require any correction to their programs or any correcting process so that they all can issue a "packet having a specific data format" immediately before issuing a job request (print job).

In addition, no job can be performed from an existing client application to the device (including a printer) which has once entered the sleep status.

On the other hand, in case a "packet having a specific data format" is configured such that the packet can contain data understood by anybody (any network device), the packet is frequently issued over a network, therefore the devices could be easily and frequently waked up from the sleep status (a communication request such as a discovery packet, etc., is frequently issued from a client node especially with w plug and play protocol represented by UPnP (registered trademark), BMLinkS (registered trademark), Rendezvous (registered trademark) used in the network system), thereby failing in realizing the power saving operation aimed at.

DISCLOSURE OF THE INVENTION

Furthermore, it is also assumed that the above-mentioned conventional technology cannot support the request of a system administrator who needs to avoid the managed devices from waking up by a general client. Therefore, an effective countermeasure is required.

The present invention has been developed to solve at least one of the above-mentioned problems. An aspect of the present invention is a network service system in which a service providing device connected over a network for performing predetermined capability processing can communicate with a plurality of client devices for performing network connection capability processing for recognizing the connection status of each service providing device over a network, and provides a network service system, a service proxy processing method, a computer-readable storage medium storing a program, and the program therefore to freely generate a network service system environment in which when a specific service providing device connected over a network and capable of performing predetermined capability processing enters a state in which the device does no receive capability processing request for a predetermined period, the specific communications capability processing of the specific service providing device is performed as a proxy service by another service providing device and the original service providing device is changed into a power saving mode, and when in the power saving mode the proxy service providing device for performing the communications capability processing receives from a client a capability processing request for the service providing device set in the power saving mode, the service providing device requested to perform the proxy communications capability processing is identified, and the service providing device designated for the communications capabilities regains the alive status, thereby quickly turning the specific service providing device to the power saving mode over the network regardless of the packet traffic in the network, and turning only the specific service providing device set in the power saving mode quickly to the alive status in which normal capability processing can be performed.

Other features and advantageous of the present invention will be apparent from the following description taken in conjunction with the accompanying drawings, in which like reference characters designate the same of similar parts throughout there of.

BRIEF DESCRIPTION OF THE DRAWINGS

FIG. 4 shows an example of an HTTP packet issued over a network from the printer shown in FIG. 1;

FIG. 5 shows an example of an HTTP response issued over a network from the proxy shown in FIG. 1;

FIG. 7 shows an example of an HTTP request issued over a network from the communications processing unit shown in FIG. 1;

FIG. 8 shows an example of an HTTP response issued over a network from the proxy shown in FIG. 1;

FIG. 10 shows an example of an HTTP request issued over a network from the communications processing unit shown in FIG. 1;

FIG. 11 shows an example of an HTTP response issued over a network from the communications processing unit shown in FIG. 1;

FIG. 14 shows an example of an HTTP request issued over a network from the printer shown in FIG. 1;

FIG. 15 shows an example of an HTTP response returned from the communications processing unit of the printer shown in FIG. 1;

FIG. 17 is an explanatory view showing the memory map of a storage medium storing various data processing programs readable by a print system according to the present invention.

BEST MODE FOR CARRYING OUT THE INVENTION

The preferred embodiments of the present invention are explained in detail by referring to the attached drawings. However, the protocol, the version, the address, and other values, etc., described in the embodiments are not limited to those described in the present invention unless otherwise specified.

Figure 1:
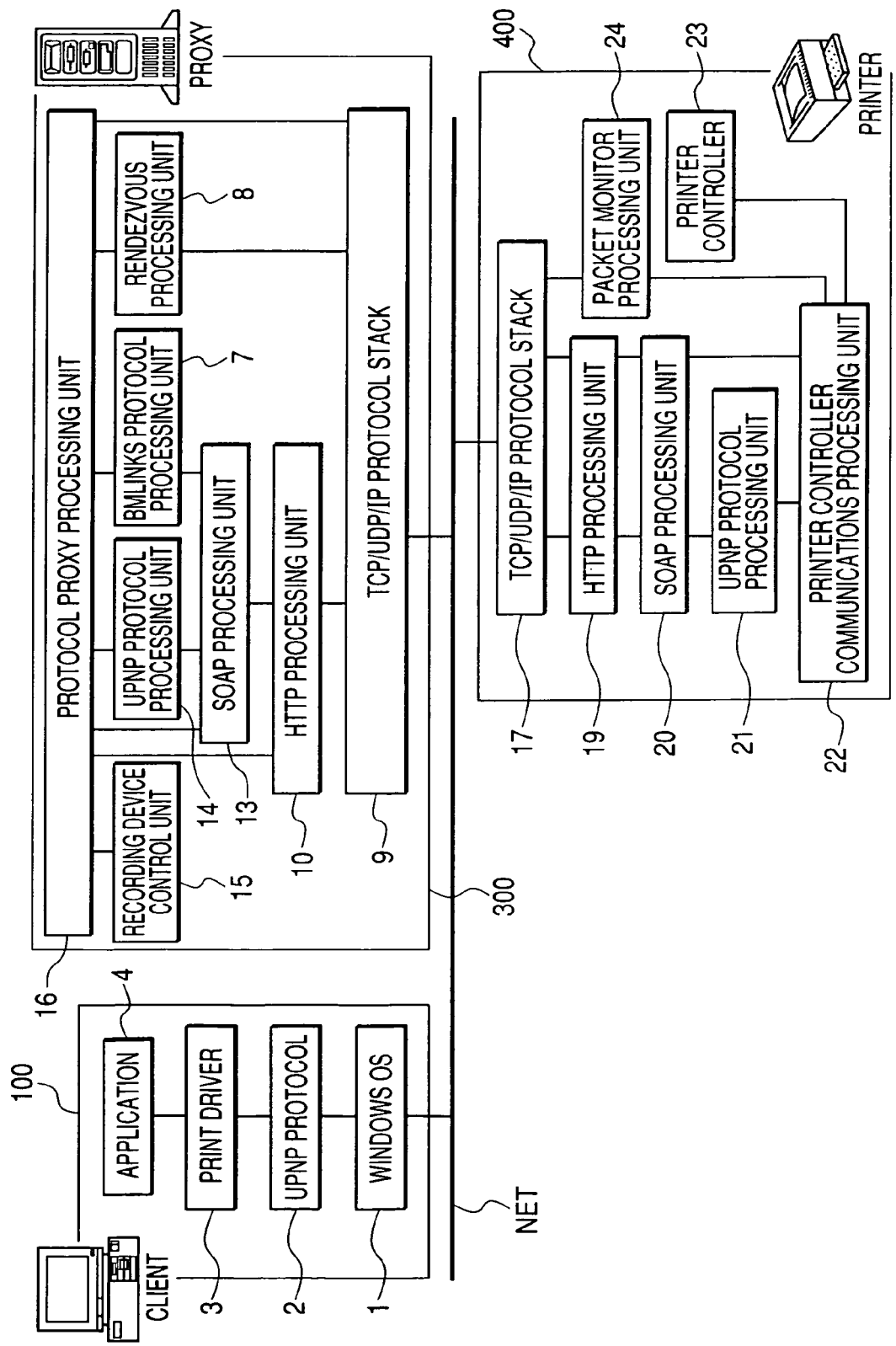
FIG. 1 is a block diagram showing the configuration of the network service system according to the first embodiment of the present invention.

FIG. 1 is a block diagram showing the configuration of the network service system showing an embodiment of the present invention. For example, it corresponds to an example in which a client device (client 100) is configured to communicate with a proxy (proxy 300) and a printer device (printer 400) over a network NET. In the explanation, there is only one client 100, one proxy 300 and one printer 400 in the network NET, but it is obvious that the present invention can also be applied to a system to which a plurality of clients, proxies, and printers are connected.

In the present embodiment, an example of a protocol conversion system as an embodiment of a service providing apparatus is described below.

In FIG. 1, a general-purpose operating system (OS) 1 such as Microsoft Windows (registered trademark), and a general-purpose application 4 executable on the operating systems, print driver 3 are installed into the client 100. The operation system, Microsoft supports the UpnP (registered trademark) Protocol 2, which are based on XML (extensible Markup Language) and SOAP (Simple Object Access Protocol), to discover, control and obtain the status of the devices available on the network. A document generated by an application 4 such as a word processor is converted into printable data by a print driver 3, and the UpnP (registered trademark) Protocol submits the print job with the printable data to the UPnP-supported printer on the network.

On the other hand, the network-capable device, that is, the network-capable printer 400 according to the present invention, has a TCP/UDP/IP protocol stack 17, and an HTTP processing unit 19 for analyzing an HTTP request and making a response is provided on the protocol stack.

A packet monitor processing unit 24, which scans all incoming frames addressed to the network-capable printer 400 for a specific data sequence specified by a communications processing unit 22 in advance, is also provided on the protocol stack A Simple Object Access Protocol (SOAP) processing unit 20 is provided for an upper layer of the HTTP processing unit 19, and an UPnP (registered trademark) protocol processing unit 21 is provided for an upper layer of the SOAP processing unit 20. The Printer controller communications processing unit 22 are provided for an upper layer of the SOAP processing unit 20 and the UpnP (registered trademark) protocol processing unit 21. Both the UpnP (registered trademark) protocol processing unit 21 and the Printer controller communications processing unit 22 exchange data described in XML (extensible Markup Language) with a client 200 and a proxy server 300 in bi-directional way.

The Printer controller communications processing unit 22 is located at the upper layer of the UPnP (registered trademark) protocol processing unit 21, the SOAP processing unit 20, the HTTP processing unit 19, and the packet monitor processing unit 24, and controls various network communications protocol supported by the printer 400, and also processes the communications with a printer controller 23.

The printer controller communication processing unit 22 also conducts data communication to switch to a sleep mode or to wakeup mode with a printer controller 23.

The protocol stack 17 and the packet monitor processing unit 24 are differently designed with other processing units, so that they could continue performing the packet monitoring process with low power consumption even when the printer 400 goes into the sleep mode. When they receive a packet with specific data sequence specified by the communications processing unit 22 in advance, they notify the communications processing unit 22 of it.

Likewise, the proxy server 300 has a TCP/UDP/IP protocol stack 9 as communications capabilities, and an HTTP processing unit 10 for analyzing an HTTP request and making a response process is provided on the protocol stack.

A Simple Object Access Protocol (SOAP) processing unit 13 is provided for an upper layer of the TCP/UDP/IP protocol stack 9, and a UPnP (registered trademark) protocol processing unit 14 and a BMLinkS (registered trademark) protocol processing unit 7 are provided at the upper layer of the SOAP processing unit 13.

A Rendezvous (registered trademark) processing unit 8 corresponding to the network protocol of Apple is provided on the upper layer of the TCP/UDP/IP protocol stack 9.

A protocol proxy processing unit 16 is located at the upper layer of the SOAP processing unit 13, the UPnP (registered trademark) protocol processing unit 14, the BMLinkS (registered trademark) protocol processing unit 7, the Rendezvous (registered trademark) processing unit 8, the HTTP processing unit 10 and the protocol stack 9, and it performs a proxy process on the protocol specified by the network-capable device, that is, the network-capable printer 400 in the present embodiment, changes into the sleep mode.

Furthermore, the protocol proxy processing unit 16 records the information on the network-capable printer in the format of the management table onto the recording device controlled by the recording device control unit 15.

Reading/writing operations are performed through the recording device control unit 15 by the protocol proxy processing unit 16 on various documents required for performing each proxy processes.

The protocol proxy processing unit 16 obtains the detailed contents of the notify request issued by another proxy server through the SOAP processing unit 13, and performs a necessary process according to the contents requested.

The protocol proxy processing unit 16 also reads/writes the management table managed by the proxy server 300 on the recording device through the recording device control unit 15.

The flow of the control of the present system is described below by referring to the flowchart.

Figure 2:
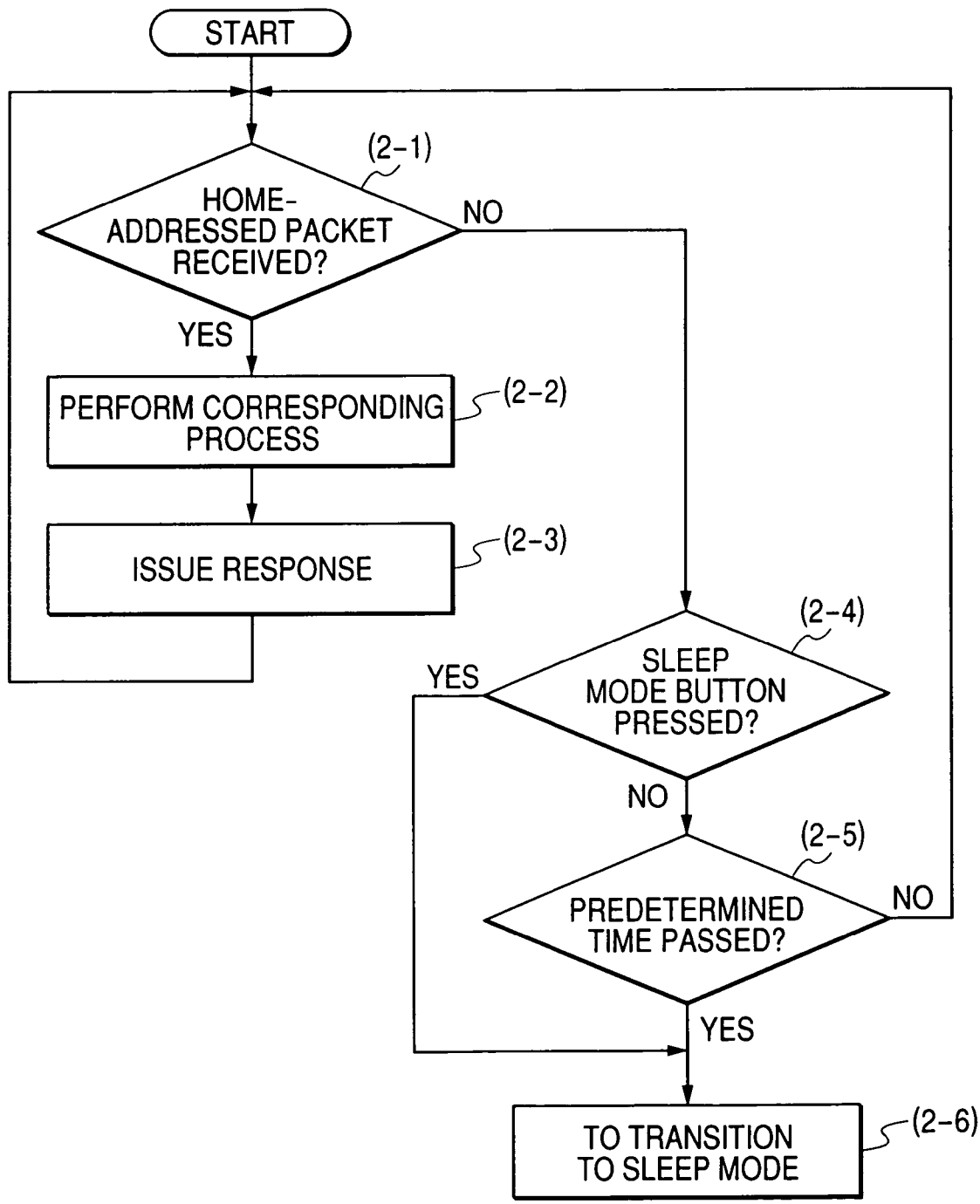
FIG. 2 is a flowchart showing an example of the first data processing procedure in the network service system according to the present invention.

FIG. 2 is a flowchart showing an example of the first data processing procedure in the network service system according to the present invention, and corresponds to the sleep mode transition processing procedure in the printer 400 shown in FIG. 1. (2-1) to (2-6) indicate steps. Each step is assumed to be performed by the printer controller 23 shown in FIG. 1 loading the control program into the RAM from the storage device including the ROM not shown in the attached drawings.

After the printer 400 first activates a predetermined initializing process, it determines whether or not a communications packet specified by the UPnP (registered trademark) has been issued by the client 100 and received in step (2-1). If it is determined that the issued communications packet has been received, and if a print job has been issued, then a predetermined process is performed in step (2-2) in accordance with the prescriptions of the UPnP (registered trademark).

Then, in step (2-3), the response process is performed on the communication request issued to the printer 400 on each type of communications protocol specified by TCP/IP/UDP, thereby returning control to step (2-1).

If it is determined that no communications packet is received in step (2-1), then it is determined in step (2-4) whether the transition to the sleep mode is indicated by a specified switch provided on an operation unit (not shown in the attached drawings) of the printer 400. If it is determined that the transition to the sleep mode is indicated, control is passed to step (2-6), and the printer 400 changes into a sleep mode.

If it is determined in step (2-4) that the transition to the sleep mode is not indicated, the timer function not shown in the attached drawings in the printer controller 23 is operated to determine whether a predetermined time for determination of a transition to the sleep mode set in advance has passed (2-5). If it is determined that a predetermined time has not passed, control is returned to step (2-1). If it is determined that a predetermined time has passed, control is passed to step (2-6), and then the printer 400 changes into a sleep mode. Thus, if there is no communication request from the network NET within a predetermined time, or if an instruction to the switch provided in the operation unit (not shown in the attached drawings) of the printer 400 is detected, then the printer 400 changes into a sleep mode.

Figure 3:
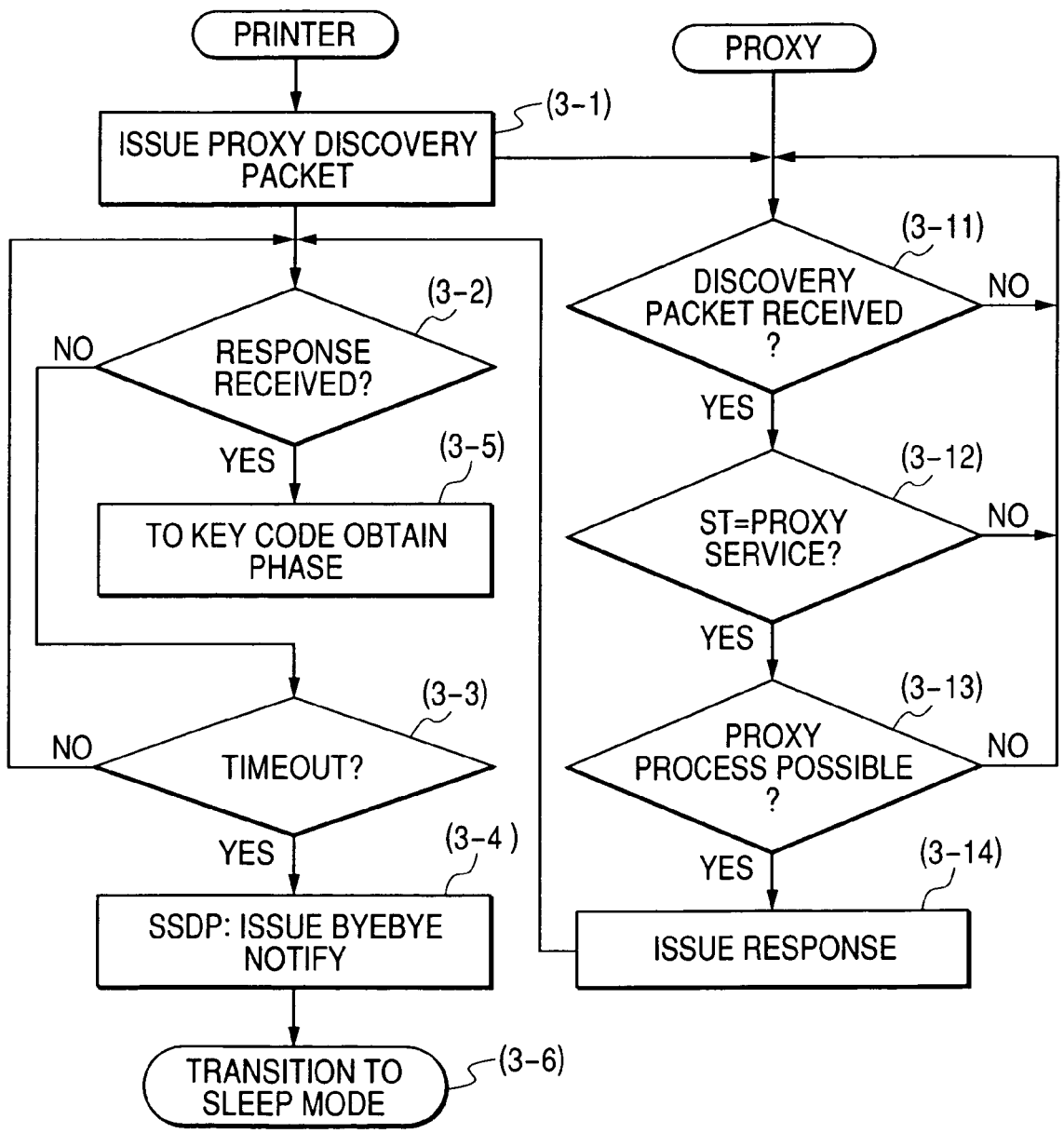
FIG. 3 is a flowchart showing an example of the second data processing procedure in the network service system according to the present invention.

FIG. 3 is a flowchart showing an example of the second data processing procedure in the network service system according to the present invention. It corresponds to, in the sleep mode process by the communications processing unit 22 shown in FIG. 1, the procedure of searching whether the proxy capable of processing a proxy communications process is in the network. The steps (3-1) to (3-6) correspond to the steps of the printer 400, and the steps (3-11) to (3-14) correspond to the steps of the proxy 300. Each step assumes that each device is realized by the storage device control unit 15, the printer controller 23, etc., loading the control program from the memory device and executing the program.

First, the communications processing unit 22 of the printer 400 issues the HTTP request in the format shown in FIG. 4 as an HTTP packet (3-1).

In the present embodiment, the protocol used in the search uses SSDP specified by the UPnP (registered trademark) architecture 1.0. In step (3-1), using the multicast address "239.255.255.250" for the port number 1900, the HTTP request in the format shown in FIG. 4 is issued as an HTTP packet.

FIG. 4 shows an example of an HTTP packet issued by the printer 400 shown in FIG. 1 over the network.

In the present embodiment, SOAP is used as an entity body of the HTTP request, and the printer announces information on the protocols to be commissioned by a proxy server with the request.

The available format is described in the envelope tags 4-1-A and 4-1-B in the HTTP request as shown in FIG. 4, and the MyID 4-2 as an argument of a FindProxy request is unique information (specific ID) to identify the printer 400 shown in FIG. 1 among the network devices, for example, a plurality of printers connected to the network according to the present embodiment. In the present embodiment, for example, an ASCII character string formed by 16 characters is used as an ID. The ID is used as very important information when a proxy 300 receives a request for printer 400 in a sleep mode. By implementing this ID as a destination for wake up packets, we can release sleep mode of one or more desired printers without releasing sleep mode of undesired printers by multicasting wake up packet. Furthermore, this ID is referred when proxy 300 send a notification of unicast to specified printers (for example, printer 400).

The above-mentioned ID can be generated in an arithmetic process using the hardware resource information (for example, a MAC address, etc.) of the printer 400, or can be assigned to nonvolatile memory as fixed information.

Furthermore, a proxy can provide a protocol proxy processing function for a plurality of network devices, and records a request from each device in a format of a management table. The ID is used in associating the contents of the management table with a device.

The RequestedProtocol 4-3 is a tag specifying the protocol to be commissioned by a proxy.

In the example of the RequestedProtocol 4-3 shown in FIG. 4, the UPnP (registered trademark) v1 protocol and the Apple Rendezvous (registered trademark) protocol are specified as a requested protocol, and indicate to discover the proxy capable of performing the proxy processes for requested protocol.

On the other hand, if the proxy server 300 having a protocol proxy processing service shown in FIG. 1 receives an HTTP request (3-11), and then analyzes the Service Type (ST) header of the request (3-12).

When it is determined that an ST is not specified as Proxy-Server, or there are incorrect contents in the packet, then control is passed to a predetermined end, the process is suspended, and the HTTP request is ignored without issuing a response. Then, as a result, control is returned to the retrieval packet reception status in step (3-11).

On the other hand, if the content of the ST header is specified as ProxyServer in step (3-12), the proxy server 300 keeps analyzing the entity body of the HTTP request continues.

That is, the contents of RequestedProtocol, which is an argument of the FindProxy request are checked, and the protocol proxy processing unit 16 determines whether it is possible perform the proxy process for the requested protocol (3-13). If the protocol proxy processing unit 16 determines that the requested protocol is not supported, then control is passed to the end, and the request is ignored without issuing a response. As a result, control is returned to the retrieval packet reception status in step (3-11).

In the printer 400, the printer controller communications processing unit 22 determines the response reception status (3-2). When it determines that no response is received from the network, and then it determines whether a predetermined time, for example, in the present embodiment, a timer for counting 30 seconds indicates a timeout, that is, it determines whether a response has been received within 30 seconds. If it determines that a timeout has occurred, the ssdp (bye-bye packet) specified by the UPnP (registered trademark) is multicast (3-4) to the network, and then it temporarily cuts off the network communications, and changes into the sleep mode according to the present embodiment (3-6).

Thus, the printer 400 multicasts the bye-bye packet to notify the network-capable equipment in the network NET that the printer 400 has entered the offline status from the network.

If the protocol proxy processing unit 16 determines in step (3-13) that the proxy process can be performed, then, for example, the HTTP response in the format shown in FIG. 5 is issued to the printer 400 using its unicast address (3-14).

Then in the printer 400, the printer controller communications processing unit receives the HTTP response from the proxy server 300 through the HTTP processing unit 19 and SOAP processing unit 20 (3-5).

FIG. 5 shows an example of an HTTP response issued by the proxy 300 shown in FIG. 1 over a network.

Figure 6:
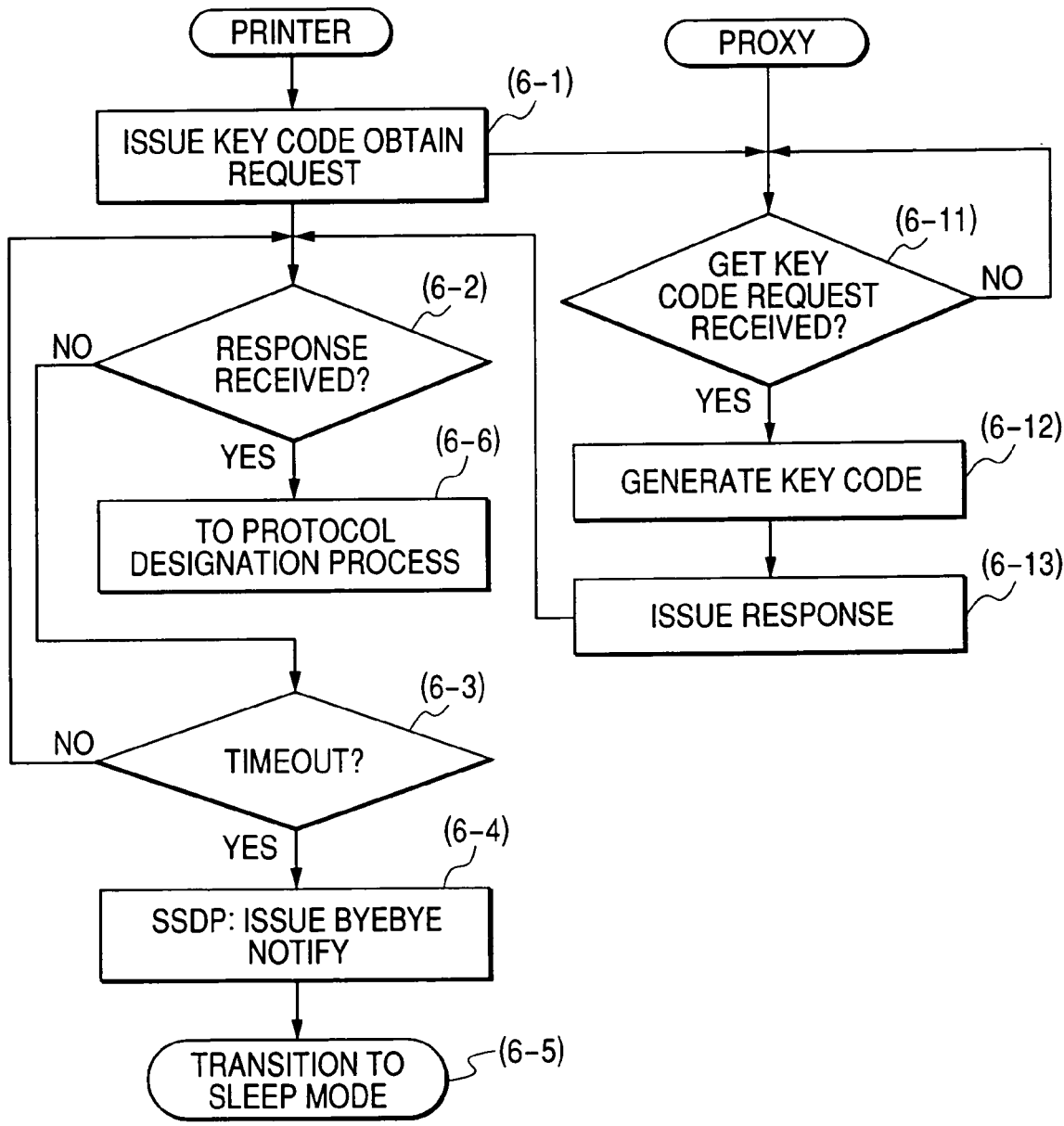
FIG. 6 is a flowchart showing an example of the third data processing procedure in the network service system according to the present invention.

At this time, the SOAP is used as an entity body of the HTTP response, the URL information (KeyCodeURL 5-1) for obtaining a key code, and the proxy process request destination URL (ProxyRequestURL 5-2) are announced to the printer 400 according to the procedure of the flowchart shown in FIG. 6.

In case the printer controller communications processing unit 22 received more than one response from a plurality of proxies (not shown in FIG. 1), the printer controller communication processing unit 22 uses the proxy 300 of which response has been received first.

FIG. 6 is a flowchart showing an example of the third data processing procedure in the network service system according to the present invention. To switch to the sleep mode process by the printer controller communications processing unit 22 shown in FIG. 1, the printer controller communications processing unit 22 corresponds to the procedure of issuing a request to obtain key code information to the proxy. (6-1) to (6-6) correspond to the step of the printer 400, and (6-11) to (6-13) correspond to the steps of the proxy 300.

First, the printer controller communications processing unit 22 issues a request to obtain key code information to the proxy 300 (6-1).

A key code is obtained using HTTP POST. For example, an HTTP request in the format shown in FIG. 7 is issued to the KeyCodeURL obtained first, but at this time, the SOAP is used as an entity body of the HTTP request, and the ID information about the printer is announced when the key code obtain packet is issued. The format is described in the envelope tag during the HTTP request shown in FIG. 7, and the myID 8-1 is announced as a printer identification ID announced in the preceding discovery process as an argument of the GetKeyCOde request.

The proxy server 300 having a protocol proxy processing service generates a key code (6-12) after receiving a HTTP request (6-11).

In the present embodiment, a key code is an ASCII code formed by, for example, 16 character string, and is generated by random numbers for the respective characters.

After generating the key code, the proxy 300 records the received ID information about the printer (for example, the printer 400), and unicasts an HTTP response in the format shown in FIG. 8 to the printer (6-13).

FIG. 8 shows an example of an HTTP response issued by the proxy server 300 shown in FIG. 1 over a network.

Then, the SOAP is used as an entity body of the HTTP response, and the KeyCode is announced to the printer controller communications processing unit 22.

In the printer 400, the printer controller communications processing unit 22 determines the response reception status (6-2). When it determines that no response is received from the network, it is determined whether a predetermined time, for example, in the present embodiment, a timer for counting 30 seconds indicates a timeout, that is, it determines whether a response has been received within 30 seconds (6-3). If it determines that a timeout has occurred, the ssdp (bye-bye packet) specified by the UPnP (registered trademark) is multicast (6-4) to the network, and then it temporarily cuts off the network communications, and changes into the sleep mode according to the present embodiment (6-5).

Figure 9:
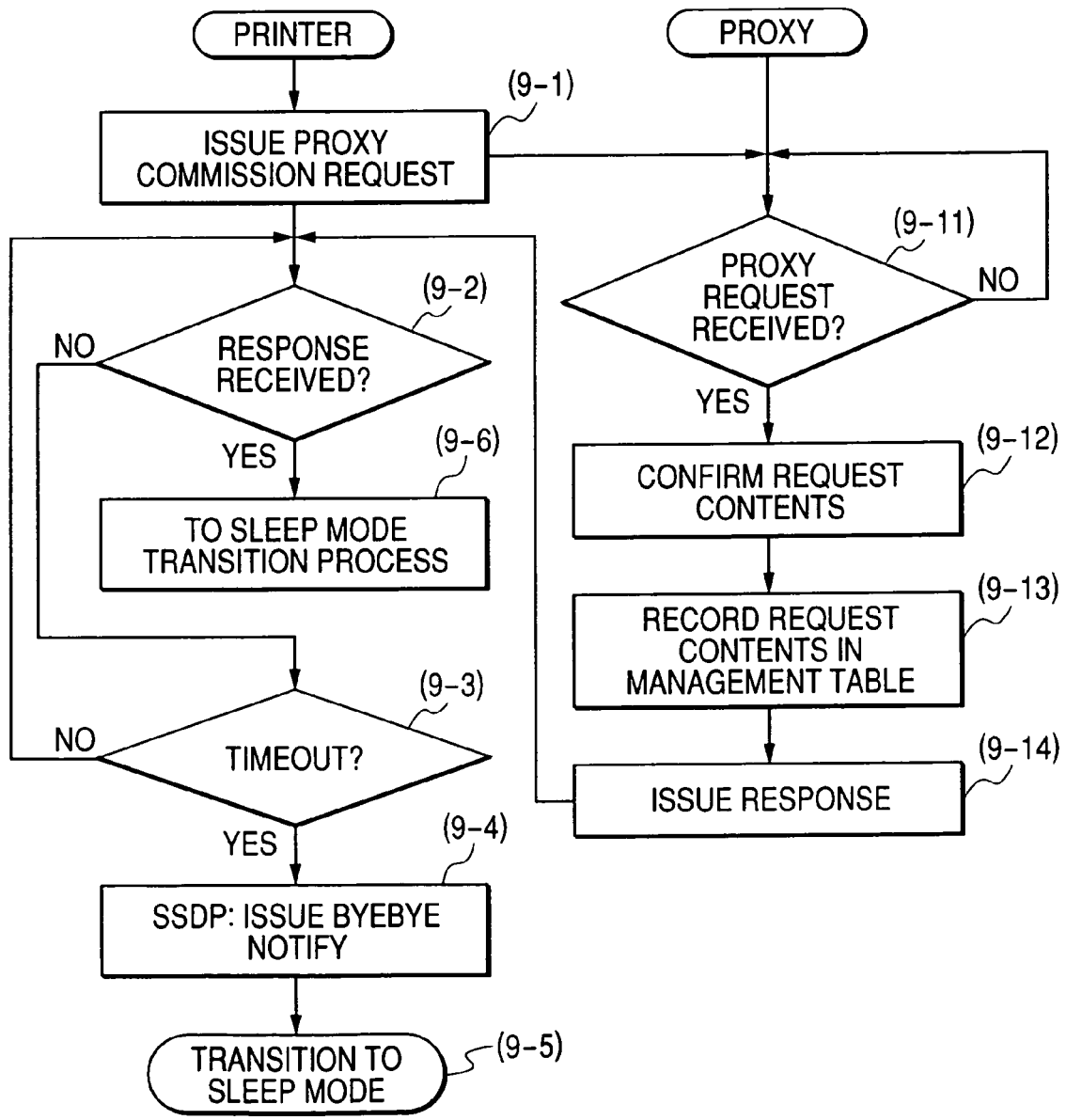
FIG. 9 is a flowchart showing an example of the fourth data processing procedure in the network service system according to the present invention.

If an HTTP response is received from the proxy 300 in step (6-2), the printer controller communications processing unit 22 of the printer 400 records the announced key code, and then the process of designating the protocol whose detailed procedure is shown in FIG. 9 is performed to request the proxy 300 to perform the proxy process in step (6-6).

FIG. 9 is a flowchart showing an example of the fourth data processing procedure in the network service system according to the present invention, and corresponds to the procedure of the communications processing unit issuing a proxy commitment request to the proxy during the sleep mode processing by the printer controller communication processing unit 22 shown in FIG. 1. (9-1) to (9-6) correspond to the steps of the printer 400, and (9-11) to (9-14) correspond to the steps of the proxy 300.

First, the printer controller communications processing unit 22 of the printer 400 issues an HTTP request (9-1).

In the present embodiment, in addition to the designation of the UPnP (registered trademark), BMLinkS (registered trademark), Apple Rendezvous (registered trademark) protocols, a proxy request for each phase can be made, and the HTTPPOST is used in committing a proxy process. For example, an HTTP request in the format shown in FIG. 10 is issued to the ProxyRequestURL obtained before.

FIG. 10 shows an example of an HTTP request to be issued over a network by the printer controller communications processing unit 22 shown in FIG. 1.

According to the present embodiment, SOAP is used as an entity body of the HTTP request, and the ID information about a printer is announced when a proxy process commitment packet is issued.

The format is described in the envelope tags 10-1-A and 10-1-B in the HTTP request shown in FIG. 10, and MyID, that is, the identification ID announced in the preceding discovery process is announced as an argument in the proxy request (ProxyRequested) tags 10-2-A and 10-2-B.

In the present embodiment, the proxy 300 can perform a proxy process on a plurality of protocols, and performs the proxy processes and each phases described in the ProxyRequested tags 10-2-A and 10-2-B. No proxy process is performed on a protocol not described in the descriptions. That is, the proxy does not support the protocol communications not described in the descriptions.

The protocol name for commitment of a proxy process is described in the ProtocolName tag 10-3-A, and the phase and process for which all processes are committed of the proxy are specified in the Proxy tag 10-4.

Assume that ALL is described, the proxy processes of all phases and processes are to be committed to the proxy.

When the proxy receives the specified phase and process specified by the Wakeup tag 10-5, a wakeup packet is issued to the device identified by the MyID.

If, for example, ALL is described, a wakeup packet is issued to the device from the proxy relating to all phases and processes of the protocol specified by the protocol name.

In the case of the description example shown in FIG. 10, discovery phase, description phase, and event subscribe indicate the commitment to the proxy for each phase configuring the UPnP (registered trademark) v1 protocol.

Control and presentation phase indicate a request to wake up the printer 400 when the proxy 300 receives a request packet from the client 100.

When the proxy receives a request packet from a client for all processes, a request to wake up the printer 400 is indicated for the Apple Rendezvous (registered trademark) protocol.

Relating to other protocols, a request not to issue a response to the request packet from a client is indicated.

The definition in the protocol tag 10-3-A and 10-3-B is arbitrary. Based on the protocol-defined form, for example, a protocol to which a response is issued and a combination of protocols are described so that the aspect of the protocols to which a response is to be returned can be freely set.

Thus, the network administrator and a specific user can freely adjust the reception environment in which a packet can be returned to allow the printer 400 in the sleep status in the network to regain the job reception wait status.

The server 300 having the protocol proxy processing service first receives an HTTP request (9-11), analyzes an entity body, and checks the request contents from the communications processing unit (9-12). If it determines that there is no error in the request contents, the request contents from the printer controller communications processing unit 22 are recorded in the management table stored in the recording device not shown in the attached drawings through the recording device control unit 15 (9-13).

After the request contents from the printer controller communications processing unit 22 are recorded in the management table, the proxy 300 unicasts the HTTP response in the format shown in FIG. 11 to the printer 400 (9-14).

FIG. 11 shows an example of an HTTP response issued over a network from the communications processing unit 22 shown in FIG. 1.

On the other hand, if the printer controller communications processing unit 22 of the printer 400 determines in step (9-2) that no HTTP response has been received from the proxy 300, and when it determines that no response is received from the network, it is determined whether a predetermined time, for example, in the present embodiment, a timer for counting 30 seconds indicates a timeout, that is, it determines whether a response has been received within 30 seconds (9-3). If it determines that a timeout has occurred, the ssdp (bye-bye packet) specified by the UPnP (registered trademark) is multicast (9-4) to the network, and then it temporarily cuts off the network communications, and change into the sleep mode according to the present embodiment (9-5).

Figure 12:
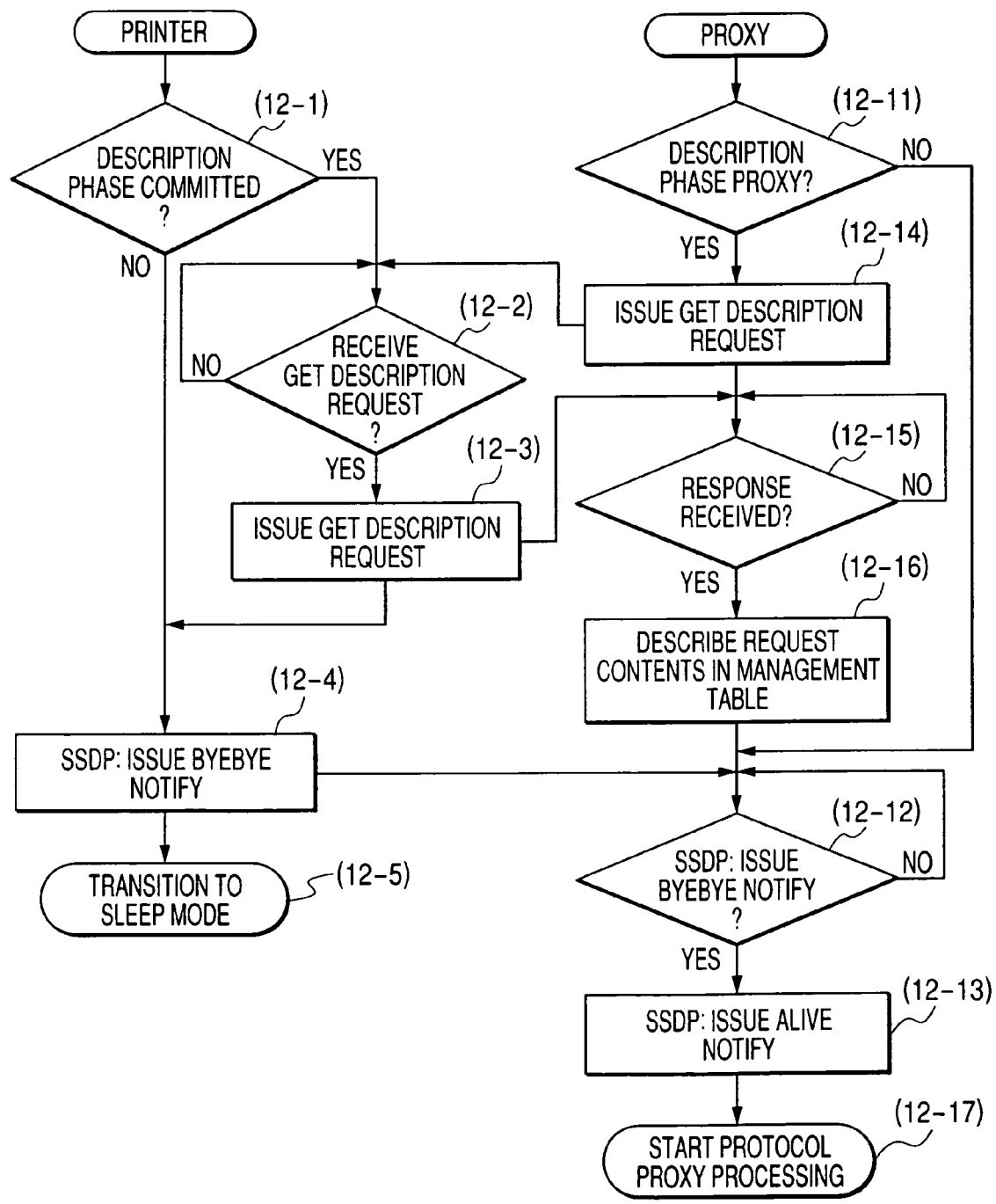
FIG. 12 is a flowchart showing an example of the fifth data processing procedure in the network service system according to the present invention.

On the other hand, if an HTTP response in the form shown in FIG. 11 (HTTP/1. 1200OK) is received from the proxy 300 in step (9-2), the printer controller communications processing unit 22 of the printer 400 goes into a sleep mode transition process whose procedure is shown in FIG. 12 in step (9-6).

FIG. 12 is a flowchart showing an example of the fifth data processing procedure in the network service system according to the present invention, and corresponds to the sleep mode procedure by the printer controller communications processing unit 22 shown in FIG. 1. (12-1) to (12-5) correspond to the steps of the printer 400, and (12-11) to (12-17) correspond to the steps of the proxy 300.

After the printer controller communications processing unit 22 in the printer 400 receives a response from the proxy 300, it starts a sleep transition process. However, according to the present embodiment, as shown in FIG. 10, the proxy process of the discovery/description phase specified by the UPnP (registered trademark) v1 is committed to the proxy 300, and the next step is a discovery, description request process issued from the proxy 300.

In this process, the proxy 300 obtains the information necessary for the proxy process from the printer controller communications processing unit 22 of the printer 400, and records the obtained information in the recording device through the recording device control unit 15.

Practically, the printer 400 determines whether the commitment of the description phase is requested (12-1). If it determines that the commitment is not requested, it multicasts the ssdp (bye-bye packet) specified by UPnP (registered trademark) (12-4), and changes into the sleep mode (12-5)

When the proxy process is committed to the proxy, the printer 400 cuts off the main processes of the network communications in the sleep mode, however the packet monitor processing unit 24 continues to scan all incoming frames addressed to the printer 400 for a specific data sequence.

On the other hand, if the printer 400 is determined that the commitment of the description phase is requested, an issue of an acquisition request for attribute information, etc., relating to the description from the proxy 300 is awaited (12-2). When the acquisition request from the proxy 300 is received, the description request (response) is issued (12-3), ssdp (bye-bye packet) specified by UPnP (registered trademark) is multicast (12-4), and then the sleep mode is entered (12-5).

On the other hand, the proxy 300 determines as shown in FIG. 10 whether the proxy of description phase is specified (12-11). If it is determined that the proxy of description phase is not specified, the proxy 300 receives ssdp (bye-bye packet) specified by UPnP (registered trademark) from the printer controller communications processing unit 22 of the printer 400 (12-12), then the proxy 300 multicasts (issues) the ssdp (alive) packet specified by UPnP (registered trademark) v1 over the network NET (12-13), and starts the proxy process communications (12-17).

On the other hand, if it is determined in step (12-11) that the proxy of description phase is specified, a description request is issued to the printer controller communications processing unit 22 of the printer 400 (12-14), a response to the description request is awaited from the printer controller communications processing unit 22 of the printer 400 (12-15), and the request contents are stored in the management table in the recording device control unit 15 when the response to the description request is received (12-16).

After the ssdp (bye-bye packet) specified by the UPnP (registered trademark) is received from the printer controller communications processing unit 22 of the printer 400 (12-12), the proxy 300 multicasts (issues) the ssdp (alive) packet specified by the UPnP (registered trademark) v1 (12-13) over the network NET, and starts the proxy process communications (12-17).

Relating to the protocol other than the UPnP (registered trademark) v1, when it is necessary to notify the proxy 300 of the attribute information, etc., about the printer 400, the printer controller communications processing unit 22 notifies the protocol proxy processing unit 16 of the proxy of it in the procedure specified by each protocol in step (12-16). Upon receipt of the attribute information, etc, the protocol proxy processing unit 16 of the proxy 300 records it in the recording device through the recording device control unit 15

When the processes are completed, the printer controller communications processing unit 22 announces the disconnection from the network by multicasting the bye-bye packet specified by the UPnP (registered trademark) v1 over the network, and the communications processing unit 22 of the printer 400 notifies the printer controller 23 of the transition to the sleep mode.

Upon receipt of the notification, the printer controller 23 changes into the sleep mode. Thus, it enters the power saving mode in which electric power is supplied only to the packet monitor processing unit 24 and the TCP/IP/UDP protocol stack 17 under the control of the power supply control unit.

Figure 13B:
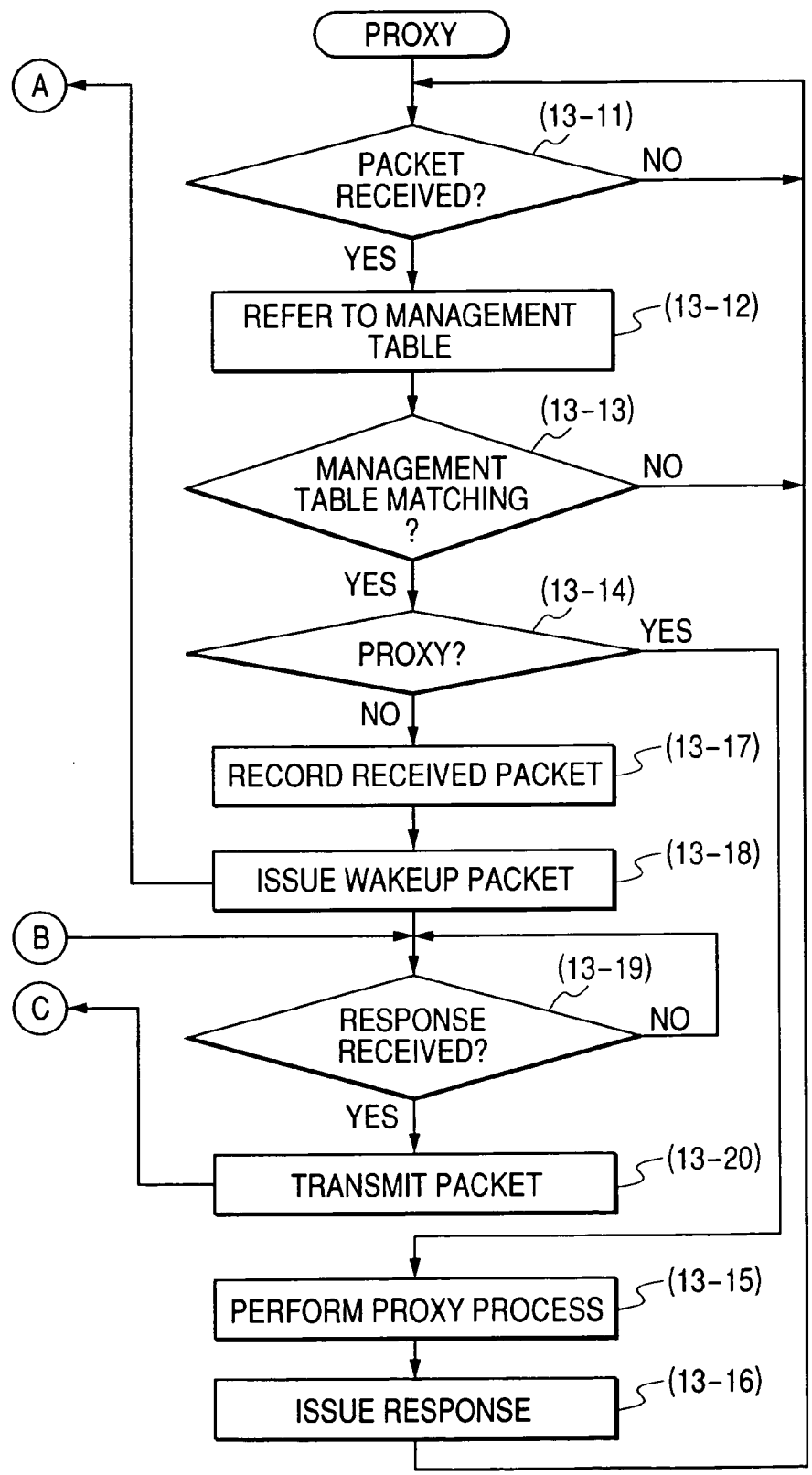
FIG. 13 is comprised of FIG. 13A and FIG. 13B, which are flowcharts showing an example of the sixth data processing procedure in the network service system according to the present invention.

FIGS. 13A and 13B are flowcharts showing an example of the sixth data processing procedure in the network service system according to the present invention, and correspond to the protocol proxy processing procedure by the proxy 300 shown in FIG. 1. (13-1) to (13-9) correspond to the steps of the printer 400, and (13-11) to (13-20) correspond to the steps of the proxy 300.

First, upon receipt of a packet over the network NET (13-11), the protocol proxy processing unit 16 of the proxy 300 refers to the contents of the received packet by comparing them with the registered information in the management table managed by the recording device control unit 15 (13-12), determines whether the contents of the received packet refer to the protocol and phase not stored in the management table (13-13). If it is determined that the contents refer to the protocol and phase not stored in the management table, then the received contents are discarded, and a packet reception wait status is entered (13-11) without performing the response process.

In step (13-13), when the contents match the protocol and phase recorded in the management table as a result of the comparison with the management table, it is determined in step (13-14) whether the protocol and phase are described in the <Proxy> tag. If it is determined that the protocol and phase are described in the <Proxy> tag, they correspond to, in the present embodiment, any of the discovery, description, event subscribe phases of the UPnP (registered trademark) v1 protocol, and the protocol proxy processing unit 16 of the proxy 300 notifies any of the protocol processing units 7, 8, and 14 of the received packet.

Then, any of the protocol processing units 7, 8, and 14 of the proxy 300 analyzes the received packet, generates a substitute for a returned packet (13-15) according to the attribute information recorded in the recording device of the recording device control unit 15 and obtained from the device in advance as necessary, performs the return process (13-16), and returns to the packet reception wait status in step (13-11).

On the other hand, if it is determined that the protocol and phase are not described in the <Proxy> tag in step (13-14), they are compared with the information including the attribute information in the management table reserved and managed by the recording device control unit 15. If they are the protocol and phase stored in the management table, for example, when the protocol and phase are described in the <WakeUP> tag, then, in the present embodiment, they correspond to the control, and presentation phases of the UPnP (registered trademark) v1 protocol and all phases of the Apple Rendezvous (registered trademark) protocol. However, the protocol proxy processing unit 16 of the proxy 300 records the packet received from the client 100 in the recording device through the recording device control unit 15 (13-17), and transmits (issues) the wakeup packet to the device committed with the proxy process which is recorded in the management table, that is, the printer 400 in the present embodiment (13-18).

In the present embodiment, the HTTPPOST is used for the wakeup packet, and the HTTP request in the format shown in FIG. 14 is issued to the URL of the printer 400 committed with the proxy process which is recorded in the management table.

FIG. 14 shows an example of an HTTP request issued to the network from the proxy 300 shown in FIG. 1.

When the HTTP request is issued, in the present embodiment, the SOAP is used as an entity body of the HTTP request. When a proxy process commitment packet is issued, the KeyCode information about the proxy is announced. The format is described in the envelope tag 14-1-A and 14-1-B in the HTTP request shown in FIG. 14, and the key code is announced by the KeyCode tag 14-3 as an argument of the wakeup request tags 14-2-A and 14-2-B.

The packet monitor processing unit 24 of the printer 400 checks only the destination address and source address of the received packet (13-1). Only when the destination address is its MAC address, and the source address matches the MAC address of the proxy 300, the printer controller communications processing unit 22 of the printer 400 is notified of an activation request (13-2).

Upon receipt of an activation request, the printer controller communications processing unit 22 notifies the printer controller 23 of the release of the sleep mode (13-3), and checks the entity of the HTTP packet issued by the proxy 300.

Then, it is determined whether the key code notified and compared with the key code obtained in the above-mentioned step and recorded matches it (13-4). If it is determined that the key codes do not match each other, or no key code exists, the printer controller communications processing unit of the printer ignores the packet, and changes into the sleep mode again (13-9).

Thus, the printer controller receives 23 the notification and enters the power saving mode.

When it is determined in step (13-4) that the key codes match, the communications processing unit 22 of the printer 400 returns an HTTP response in the format shown in FIG. 15 to the proxy 300 (13-5).

FIG. 15 shows an example of an HTTP response returned from the printer controller communications processing unit 22 of the printer 400 shown in FIG. 1.

Upon receipt of the HTTP response (13-19), the proxy 300 transmits to the printer 400 the request packet received from the client 100 recorded for the printer 400 (13-20).

Upon receipt of a request packet from the proxy 300 (13-6), in the printer 400, the printer controller communications processing unit 22 of the printer 400 which received the request packet analyzes the contents of the request packet, and performs a corresponding job (13-7). Then, it performs the reactivating process on the printer 400 in the procedure shown in FIG. 16 (13-8).

Figure 16:
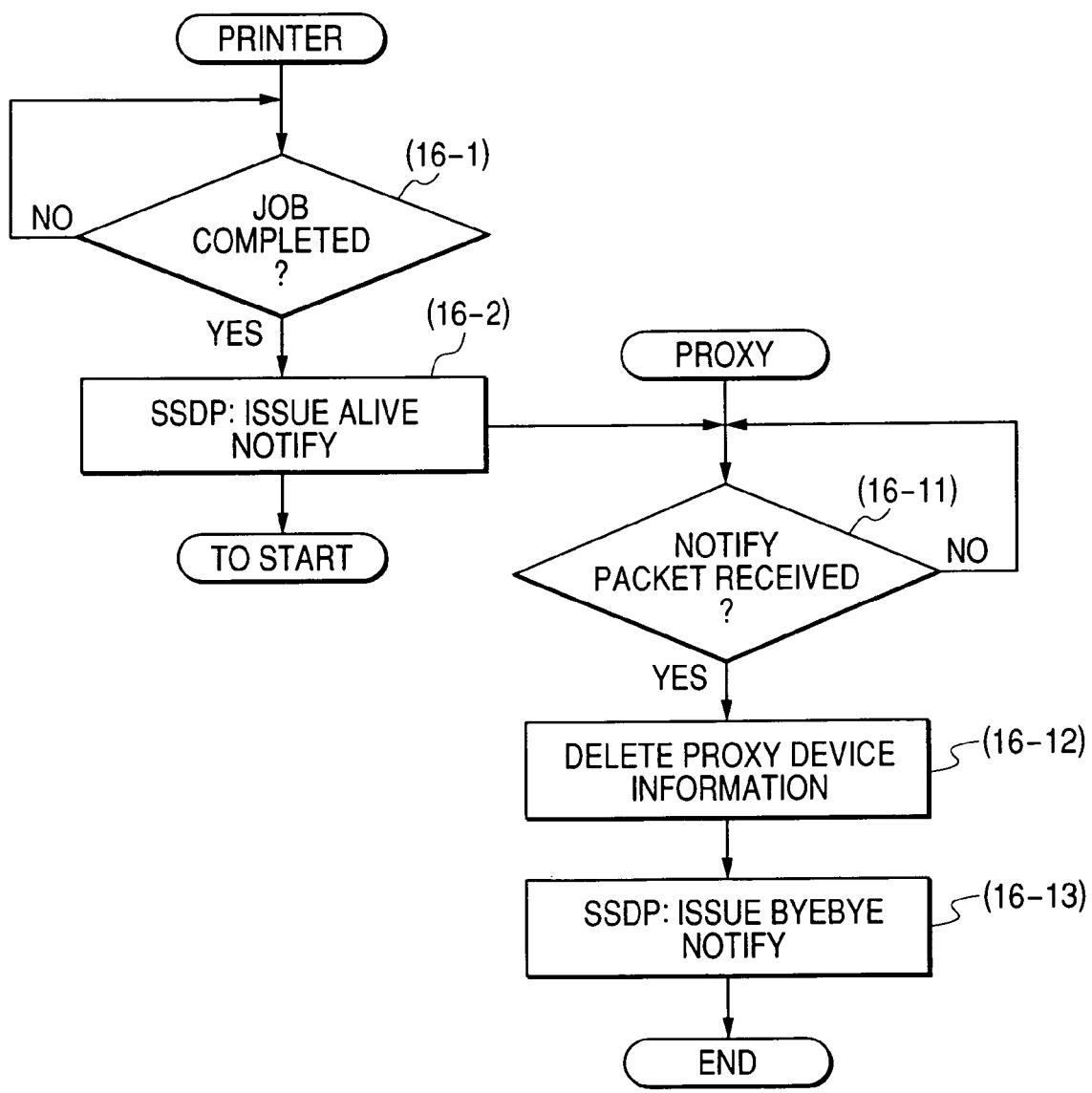
FIG. 16 is a flowchart showing an example of the seventh data processing procedure in the network service system according to the present invention.

FIG. 16 is a flowchart showing an example of the seventh data processing procedure in the network service system according to the present invention, and corresponds to the protocol proxy processing by the proxy 300 shown in FIG. 1. (16-1) to (16-2) correspond to the steps of the printer 400 and (16-11) to (16-13) correspond to the steps of the proxy 300.

When the job is completed by the printer 400 (16-1), the notify ssdp (alive packet) specified by the UPnP (registered trademark) v1 is multicast to notify another network device of the resumption of the service after the return from the sleep mode (16-2).

Upon receipt of the notify packet (16-11), the proxy 300 deletes the information about the device which has issued the notify packet based on the management table stored and managed by the recording device control unit 15 (16-12), and the proxy notifies another network device of the stop of the proxy process by multicasting the notify ssdp: bye-bye packet specified by the UPnP (registered trademark) v1, thereby terminating the proxy process for the device.

According to the present embodiment, the printer 400 realizes the commitment of the proxy process for the proxy 300 when the sleep mode is entered by repeating a series of operations.

In the above-mentioned embodiments, for example, the printer 400 is a network device, but a network-capable device can also be a storage device such as a hard disk, etc., a scanner, a copying machine, and a device which is capable of exchanging attribute information with a proxy server through communications capabilities, and is provided with the composite capabilities which is provided with communications capabilities for transmission and reception of jobs.

Furthermore, in the above-mentioned embodiment, the proxy for a protocol is a discovery protocol SSDP (Simple Service Discovery Protocol) specified by the UPnP (registered trademark) v1, but can be another standardized or unique protocol such as an SLP (Service Location Protocol).

As described above, a proxy for dynamically acting as a substitute for a protocol is not retrieved, but the address of a proxy can be set in a printer through an operation unit, etc.

According to the above-mentioned embodiments, a network-capable device is explained, for example, but a device and a proxy server for a protocol can be communicated through the USB, IEEE1394, a local connection such as a parallel system, etc.

In the above-mentioned embodiments, a proxy for a protocol is explained as a function implemented in a network on a physically independent device, but it can also be a printer incorporated into a device.

That is, in the printer shown in FIG. 1, the present invention can be realized although the protocol proxy processing unit is implemented using the same hardware as the printer controller and the communications control unit, it is physically independent in power supply of the printer controller and the communications control unit, the printer controller and the communications control unit change into the power saving mode, and the protocol proxy processing unit has the configuration of possibly supplying power to realize the functions according to the present embodiment.

Furthermore, in the above-mentioned embodiment, the identification ID of the device and the key code of the proxy is represented by a character string of 16 characters, but it can be realized by using a MAC address, a UUID (Universal Unique ID), etc., as far as it can be uniquely identified.

To avoid camouflage by another device, the ID and the key code can be encrypted in the encryption procedure.

In addition, in the above-mentioned embodiment, a protocol of a plug and play which is representative proxy protocol designation means is described, but the proxy process in a packet unit by designation of a packet having a specific data string, the proxy process in an address unit by wakeup designation of by designation of a specific multicast address, the proxy process by wakeup designation or for a packet having a MAC address or an IP address, the wakeup designation, etc., can be realized.

In the above-mentioned embodiment, the packet monitor processing unit of a printer issues an activation request to a communications processing unit when the destination of a packet is the MAC address of the printer, and the source is the MAC address of the proxy, but the process of issuing an activation request to the communications processing unit can be realized only when the packet monitor processing unit performs up to the determining process of the key code and a matching result can be obtained up to the key code.

In addition, according to the above-mentioned embodiment, a network having Ethernet (registered trademark) as a physical level is described, but the embodiment can also be realized by IEEE802.11 wireless LAN, Bluetooth (registered trademark), and other network systems.

Additionally, in the above-mentioned embodiment, the packet data in the XML/SOAP format is used in communications between a printer which is a network device and a proxy for a protocol, but uniquely defined binary data can also be used in realizing the present invention.

In the above-mentioned embodiment, the UPnP (registered trademark) v1 is used as an example. Therefore, a notify packet specified by the protocol in the transition to the sleep mode is issued. However, when other protocols are used, it is necessary to issue a notification packet specified by each protocol.

When a proxy cannot be found, or when there is no response from a proxy, the network communications are cut off and a sleep mode is entered in the above-mentioned embodiment. However, the communications from a client can be prioritized by prohibiting the transition to the sleep mode.

In a packet monitor processing unit, it is also possible to set a mode in which a sleep mode is released each time a packet addressed to the printer itself is received.

Furthermore, in the above-mentioned embodiment, after receiving wakeup from a proxy, the printer releases the sleep mode, but a mode for transition to the sleep mode again after completion of a job can also be set.

In the above-mentioned embodiment, a proxy for a protocol supports a plurality of protocols. However, there can be a proxy for supporting only the unique protocol, or a proxy for supporting a plurality of protocols realizing a print system according to the present invention.

Furthermore, not only a specific service providing device, but also a specific service providing device group configured by a plurality of specific service providing devices (by manufacturer, or by function processing capability (with the possibility of selecting color printing, processing speed, optional functions, etc., taken into account), etc.) can simultaneously enter the power saving mode and then can be simultaneously returned to the alive status, and selectively, only specific and identified service providing devices in the plurality of specific service providing devices can be simultaneously returned to the alive status.

Thus, the power saving function of the service providing device can be considerable improved regardless of the specifications of the network equipment in accordance with the UPnP (registered trademark), and only a specific service providing device which has entered the sleep mode can be waken up with pinpoint accuracy only by communicating a simple notification packet without an influence on the traffic in the network.

Therefore, the power saving capability requested for the service providing device can be effectively used, thereby largely updating the power saving effect on the entire system as compared with the conventional technology.

In each of the above-mentioned embodiments, a system of a cable network is described, but the present invention can be applied to a wireless network (what is called a network in accordance with Bluetooth (registered trademark) specifications). In this case, the service providing device can be a mobile tool capable of performing various wireless communications, for example, a PDA as a proxy for a communications process in accordance with the Bluetooth specifications, a mobile telephone, etc., for generating a more useful system according to the present invention.

In the above-mentioned embodiments, when the communications capabilities are limited to enter the power saving mode, a plurality of devices simultaneously change into a predetermined power saving level. However, when the power saving level can be stepwise set, the transition control to the power saving mode can be changed to realize a flexible power saving mode process based on the capability processing specific to each device.

Furthermore, in the above-mentioned, the printer 400 monitors the communications status of its own system for a predetermined period in performing the above-mentioned proxy power saving process, but the operation unit of the printer 400, a client (having the administrative authority), and the proxy 300 can set the schedule of an effective time range in which the process is to be performed so that the above-mentioned process can be performed within a limited time period.

Furthermore, since the proxy 300 identifies and manages the printer in the sleep mode, the information relating to the printer in the sleep mode can be obtained from a client having the right to access so that a list of printers (including the sleep starting time and the elapsed time) in the sleep mode can be displayed on the client side, and the system administrator, etc., can be informed of the power savings status.

In addition, in the communications between the client and the proxy 300, the icon of a printer in the sleep mode can be displayed on the proxy 300 in a display structure of branching to the proxy 300 according to the information about the printer in the sleep mode.

The configuration of the data processing program which can be read on a print system according to the present invention is described below by referring to the memory map shown in FIG. 17.

FIG. 17 shows the memory map of the storage medium storing a data processing program, which can be read on the print system according to the present invention.

Although not shown in the attached drawings, the information for management of a program group stored in the storage medium, for example, version information, an author, etc., are also stored, and the information depending on the program reading OS, etc., for example, an icon for identification of a program and display can also be stored.

Furthermore, the data depending on various programs is managed in the above-mentioned directory. The program for installing various programs into a computer, and a program to be installed is compressed, a program for decompressing the programs can also be stored.

The functions shown in FIGS. 2, 3, 6, 9, 12, 13A and 13B, and FIG. 16 according to the present embodiments can be performed by the host computer using externally installed programs. In this case, using a storage medium such as CD-ROM, flash memory, an FD, etc., or an external storage medium through a network, an information group including programs can be provided for an output device according to the present invention.

As described above, the objective of the present invention can also be attained by supplying the storage medium storing a program code of software for realizing the functions of the above-mentioned embodiments for a system or a device, and reading and executing by the computer (or the CPU or MPU) of the system or the device the program code stored in the storage medium.

In this case, the program code read from the storage medium realizes a new function of the present invention, and the storage medium storing the program code can configured the present invention.

The storage medium for supplying a program code can be, for example, a flexible disk, a hard disk, an optical disk, a magneto-optical disk, a CD-ROM, a CD-R, a magnetic tape, a nonvolatile memory card, a ROM, an EEPROM, etc.

Furthermore, by executing the program code read by the computer, not only the above-mentioned functions can be realized, but also the functions according to the above-mentioned embodiments can be realized in the process performed by the OS (operating system), etc., which operates in the computer, performing all or a part of the actual process at an instruction of the program code.

Furthermore, the present invention also includes the function of the embodiments realized by the process of the program code being read from the storage medium and written to a CPU provided in a feature expansion board inserted into a computer and a feature expansion unit connected to the computer, and the CPU, etc., provided for the feature expansion board and the feature expansion unit performing all or a part of an actual process at an instruction of the program code.

The present invention is not limited to the above-mentioned embodiments, but variations (including the organic combinations according to each embodiment) can be generated based on the gist of the present invention within the scope of the present invention.

Various examples and embodiments according to the present invention are described above, and the gist and scope of the present invention are not restricted by one skilled in the art to specific explanation in the present specification.

The invention claimed is:

1. A service providing device comprising at least a processor and memory, and further comprising:
   a proxy commission unit
      that commissions one of other service providing devices on a network to proxy a communication process based on a predetermined communication function to respond to a communication request from one of client devices on the network and
      that transits to a network sleep mode so as not to be recognized by the client devices;
   a discrimination unit that, when a sleep release request is received via the network in the network sleep mode, discriminates whether the sleep release request is issued by the other service providing device commissioned to proxy the communication process by said proxy commission unit; and
   a release unit that performs a release process from the network sleep mode to a network alive mode when said discrimination unit discriminates that the sleep release request is issued by the other service providing device commissioned to proxy the communication process by said proxy commission unit.

2. A service providing device according to claim 1, wherein the communication process is executed based on the received communication request after the release process from the network sleep mode to the network alive mode by said release unit.

3. A service providing device according to claim 2, wherein the other service providing device issues a key code, and if the key code does not match another key code previously issued, no response is issued to the sleep release request from the other service providing device.

4. A service providing device according to claim 3, wherein the key code comprises encrypted information.

5. A service providing device according to claim 1, wherein the other service providing device issues the sleep release request to said service providing device when the other service providing device receives a communication request for a function other than the predetermined communication function from the one client device.

6. A service providing device according to claim 1, further comprising a search unit that searches the other service providing devices on the network for one which can be commissioned to proxy the communication process.

7. A service providing device according to claim 1, wherein the other service providing device which can be commissioned to proxy the communication process includes a printer.

8. A service providing method, performed at a service providing device on a network, said method comprising:
   a proxy commissioning step, of
      commissioning one of other service providing devices on a network to proxy a communication process based on a predetermined communication function to respond to a communication request from one of client devices on the network, and
      transiting to a network sleep mode so as not to be recognized by the client devices;
   a discrimination step of, when a sleep release request is received via the network in the network sleep mode, discriminating whether the sleep release request is issued by the other service providing device commissioned to proxy the communication process in said proxy commission step; and
   a release step, of performing a release process from the network sleep mode to a network alive mode when it is determined in said discrimination step that the sleep release request is issued by the other service providing device commissioned to proxy the communication process in said proxy commission step.

9. A service providing method according to claim 8, wherein the communication process is executed based on the received communication request after the release process from the network sleep mode to the network alive mode in said release step.

10. A service providing method according to claim 9, wherein the other service providing device issues a key code, and if the key code does not match another key code previously issued, no response is issued to the sleep release request from the other service providing device.

11. A service providing method according to claim 10, wherein the key code comprises encrypted information.

12. A service providing method according to claim 8, wherein the other service providing device issues the sleep release request to the service providing device when the other service providing device receives a communication request for a function other than the predetermined communication function from the one client device.

13. A service providing method according to claim 8, further comprising a search step, of searching the other service providing devices on the network for one which can be commissioned to proxy the communication process.

14. A service providing method according to claim 8, wherein the other service providing device which can be commissioned to proxy the communication process includes a printer.

15. A non-transitory computer-readable medium, storing, in executable form, a program for causing a computer to perform a service providing method at a service providing device on a network, said method comprising:
   a proxy commissioning step, of
      commissioning one of other service providing devices on a network to proxy a communication process based on a predetermined communication function to respond to a communication request from one of client devices on the network, and
      transiting to a network sleep mode so as not to be recognized by the client devices;
   a discrimination step of, when a sleep release request is received via the network in the network sleep mode, discriminating whether the sleep release request is issued by the other service providing device commissioned to proxy the communication process in said proxy commission step; and a release step, of performing a release process from the network sleep mode to a network alive mode when it is determined in said discrimination step that the sleep release request is issued by the other service providing device commissioned to proxy the communication process in said proxy commission step.

* * * * *